(12) United States Patent
Baske et al.

(10) Patent No.: US 6,909,503 B2
(45) Date of Patent: Jun. 21, 2005

(54) CUVETTE FOR LENS INSPECTION

(75) Inventors: Gunnar Baske, Neustadt (DE); Peter Baumann, Wunstorf (DE); Ingolf Braune, Gundelfingen (DE); Roger Biel, Frankfurt am Main (DE); Peter Hagmann, Erlenbach am Main (DE); Günter Lässig, Obernburg (DE)

(73) Assignee: Novartis AG, Basel (CH)

( * ) Notice: Subject to any disclaimer, the term of this patent is extended or adjusted under 35 U.S.C. 154(b) by 297 days.

(21) Appl. No.: 10/213,972

(22) Filed: Aug. 6, 2002

(65) Prior Publication Data

US 2003/0038934 A1 Feb. 27, 2003

(30) Foreign Application Priority Data

Aug. 17, 2001 (DE) .......................................... 101 40 430
Jun. 20, 2002 (CH) ............................................... 1072/02

(51) Int. Cl.[7] .......................... G01N 1/10; G01N 21/00
(52) U.S. Cl. ....................................... 356/246; 356/440
(58) Field of Search ................................ 356/246, 440; 206/5.1

(56) References Cited

U.S. PATENT DOCUMENTS

| 3,493,306 A | | 2/1970 | Mayer | ......................... 356/246 |
| 4,415,076 A | * | 11/1983 | Campbell | ..................... 206/5.1 |
| 5,963,318 A | | 10/1999 | Held | ........................... 356/244 |

FOREIGN PATENT DOCUMENTS

| EP | 0 882 969 | 7/1994 |
| WO | WO 00/09980 | 2/2000 |
| WO | WO 00/46582 | 8/2000 |

OTHER PUBLICATIONS

Hellmas Worldwide Catalogue Showing Cylindrical Cell with PTFE Stopper, no date available.
Starna Spectrophotometer Cells—Quartz and Glass Cells for : Spectrophotometers Fluorimeters Laser Applications, pp 12–14, 1972.

* cited by examiner

Primary Examiner—Gregory J. Toaley, Jr.
Assistant Examiner—Amanda Merlino
(74) Attorney, Agent, or Firm—Karen A. Borrelli; Robert J. Gorman

(57) ABSTRACT

The invention relates to a cell for an ophthalmic lens, for testing the latter with an optical inspection system, said cell comprising a hollow space (11, 31) which is filled with a liquid and has an axis (12, 32) coinciding, in the test position, with the optical axis of an inspection system and, in the test position of the cell, is delimited from above by a viewing glass (13, 33) for the optical test and has, underneath the viewing glass, a test trough (14, 34) for the ophthalmic lens. Between viewing glass (13, 33) and test trough (14, 34), at least one insertion channel (15, 35) opens into the hollow space (11, 31), the ophthalmic lens being able to be inserted into the hollow space (11, 31) through the outer insertion opening (16, 36) of said insertion channel (15, 35)

18 Claims, 3 Drawing Sheets

Figure 2:
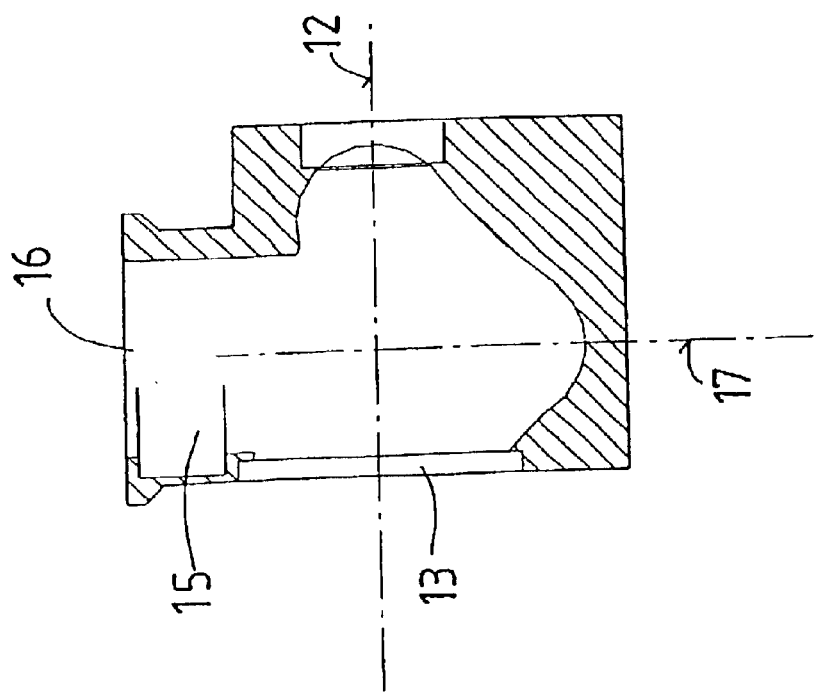

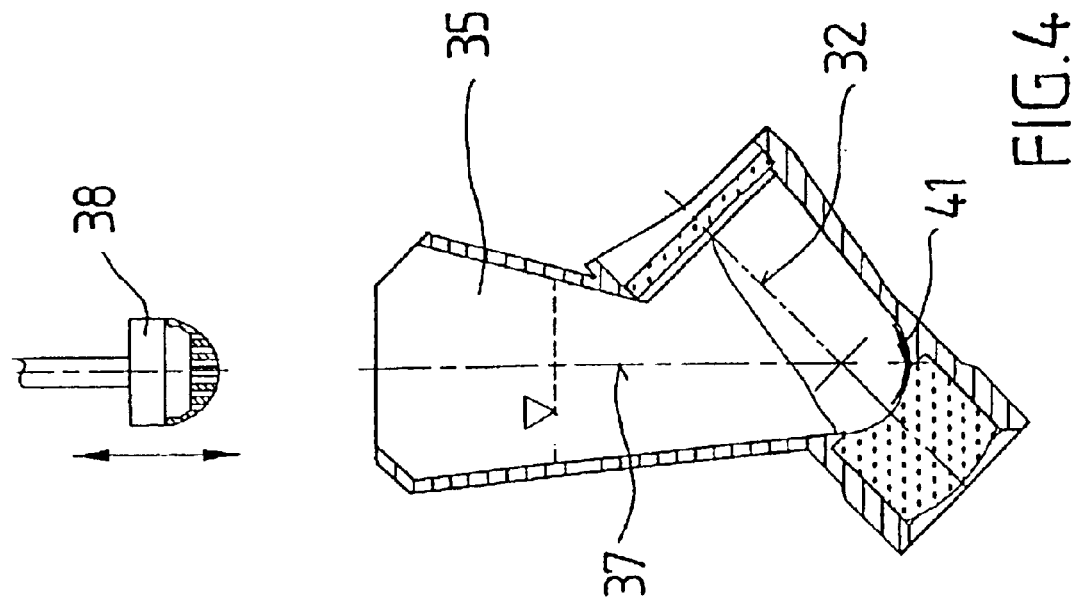
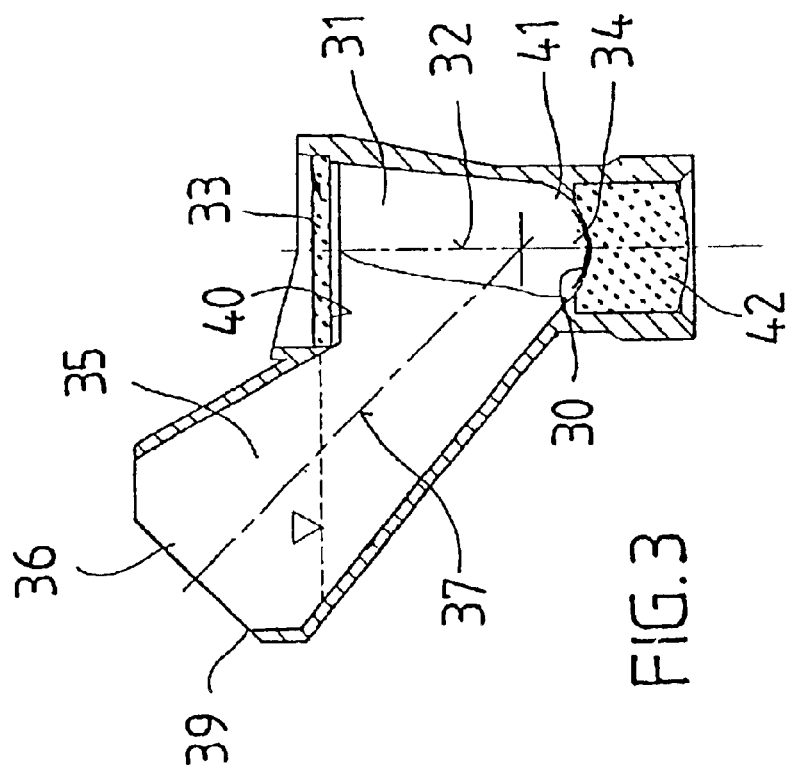

CUVETTE FOR LENS INSPECTION

The invention relates to a cell for an ophthalmic lens, for testing the latter with an optical inspection system, said cell comprising a hollow space which is filled with a liquid and, in the test position of the cell, extends along the optical axis of the inspection system and is delimited from above by a viewing glass for the optical test and has, underneath the viewing glass, a seat, in particular a test trough, for the ophthalmic lens. The invention relates in particular to a cell for the optical testing of contact lenses, so that the text below refers mainly to contact lenses, but without this being intended to imply any limitation.

It is known to produce hard and soft contact lenses in an automated production process with reusable moulds. This permits the production of contact lenses which are worn only once and are then replaced with a new lens. However, to ensure that quality remains constant, the finished contact lenses must be optically inspected.

However, soft ophthalmic lenses in particular are difficult to handle using mechanical means, and it is known to hold these in a water bath for the purpose of optical testing. It has been found that a contact lens, when inserted into a water bath, always orients itself with the concave side facing upwards. This property is made use of in the optical testing. For this purpose, cells of the aforementioned type are provided in which an individual contact lens is received. The cell is made entirely, or along the optical axis of the optical test system, of a light-transmitting material and is placed in the path of the test light in such a way that an image of the contact lens can be recorded by a suitable camera.

To create the conditions for this optical inspection, it is on the one hand necessary to ensure that the liquid and the viewing glass and the walls of the cell situated in the optical path are clean. On the other hand, there must be no free boundary surface of the liquid affecting the image. Accordingly, the underside of the viewing glass must be immersed in the liquid, and there must be no air bubbles present between liquid and viewing glass. In known cells, the contact lens is inserted into the hollow space filled with liquid and is closed off by a lid which at the same time forms the viewing glass. The insertion of the lens into the cell and the closure of the latter while avoiding inclusion of gas obviously impose very high demands on the handling equipment in question.

The object of the invention is to configure a cell of the aforementioned type in such a way that the insertion of the ophthalmic lens can be simplified. A particular aim is to ensure that, at least during inspection, the viewing glass is at all times in bubble-free contact with the liquid in order to permit an interference-free optical inspection.

According to the invention, the object is achieved by the fact that, between viewing glass and test trough, at least one insertion channel opens into the hollow space, the ophthalmic lens being able to be inserted into the hollow space through the outer insertion opening of said insertion channel. The contact lens can be inserted into the hollow space through this insertion channel without affecting the liquid under the viewing glass. It is simply necessary to ensure that, in the test position, the level of the liquid is maintained above the underside of the viewing glass. This can be achieved by an appropriate choice of the position of the insertion opening of the insertion channel.

It can be expedient if the insertion opening of the insertion channel can be tightly closed. This has the advantage that, when moving the cell to the individual stations of a test device, a loss of the liquid and also of the contact lens can be avoided. The cell can then also be swivelled into any desired position.

The insertion channel has an axis and can open into the hollow space in such a way that the insertion channel with its axis encloses, together with the hollow space and the axis of the latter, an angle of between 0° and 90°. In order to insert and/or remove the ophthalmic lens, the cell can be swivelled into a handling position in such a way that the insertion opening of the insertion channel points upwards. This facilitates the use of automated grippers. These often comprise a vacuum gripper which can preferably be moved linearly and grips the contact lens on its concave side. In this respect, particular provision is made for the insertion channel to extend vertically with its axis in the handling position. The effect of this is that the contact lens lies with the concave side upwards in the cell, so that gripping with the vacuum gripper is ensured.

In principle, it is also expedient if, in the test position, the hollow space extends with its axis vertically. This ensures that the contact lens at all times has a defined position in the test trough, namely lying with the concave side facing upwards. Use of electronic image processing is thus made considerably easier.

According to one embodiment of the invention, the insertion channel with its axis opens at an angle of between 45° and 90°, in particular 90°, into the hollow space with its axis, and the volume of the insertion channel and of the hollow space and the quantity of liquid and the position of the viewing glass are chosen such that in the test position, the underside of the viewing glass lies at or below the level of the liquid. For insertion of the contact lens, the cell is swivelled with the insertion opening upwards. After insertion, the opening is closed and the cell is turned back to the test position. In doing so, the liquid shifts, and a bubble-free contact between liquid and viewing glass is obtained as a result of the choice of the position of the viewing glass and of its underside. Closure of the cell is necessary here, however.

According to another embodiment of the invention, the insertion channel with its axis opens at an angle of between 30° and 60°, and in particular 45°, into the hollow space with its axis, and the boundary edge of the insertion opening of the insertion channel lies, in the test position, above the underside of the viewing glass. This has the advantage that closure of the insertion channel is no longer necessary. Bubble-free contact between the liquid and the viewing glass is possible.

In principle, it is expedient if, in the area around the viewing glass, there is a space acting as a gas trap, the upper boundary wall of which, in the test position, lies above the underside of the viewing glass. In this way, gas bubbles between viewing glass and liquid can be reliably avoided at all times. If the cell is open, no bubble trap is needed.

According to a further embodiment of the invention, a removal trough is present in the continuation of the insertion channel, opposite where the latter opens into the hollow space, in which removal trough, in the handling position, the ophthalmic lens lies ready for removal. This has the advantage that, in the handling position too, the contact lens assumes a defined position and can be safely gripped by the gripper. The removal trough also offers a reliable abutment and reliable guide for the contact lens and the gripper, so that damage is avoided. Of course, the contact lens, upon insertion into the cell, can also be safely placed in this removal trough, the defined orientation then not being so important.

The removal trough can be formed by recessing the lateral boundary wall of the hollow space. Here, provision can be made for the test trough to continue into the removal trough substantially without a transition or even to partially form the removal trough. Where there is a greater distance between removal trough and test trough, it is expedient if, between removal trough and test trough, there is a transition which is configured in such a way that, during swivelling from the test position to the handling position and vice versa, the ophthalmic lens slides from one trough into the other. This ensures a safe movement of the contact lens inside the cell, and the contact lens is situated at all times in the test trough in the test position and at all times in the removal trough in the handling position.

In principle, the test trough can be a constituent part of an optical lens. Provision can also be made for the viewing glass to be an optical lens. In this way, an overall compact optical structure can be obtained.

A cell according to the invention can be used particularly advantageously in a method for testing contact lenses within an automated production process (for example in a test module), as is characterized by the features of the independent method claim. Advantageous variants of the method are evident from the features of the dependent method claims.

Figure 1:
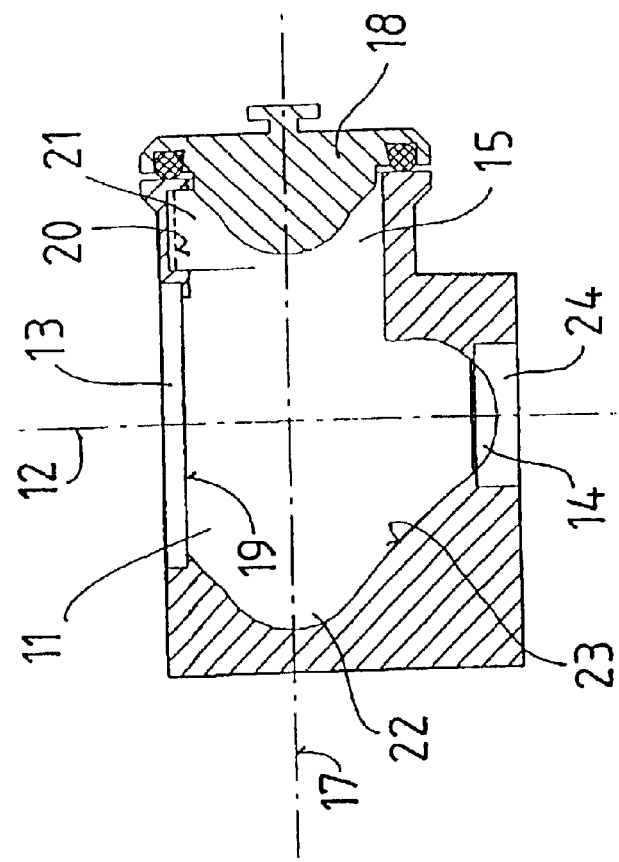
Figure 6:
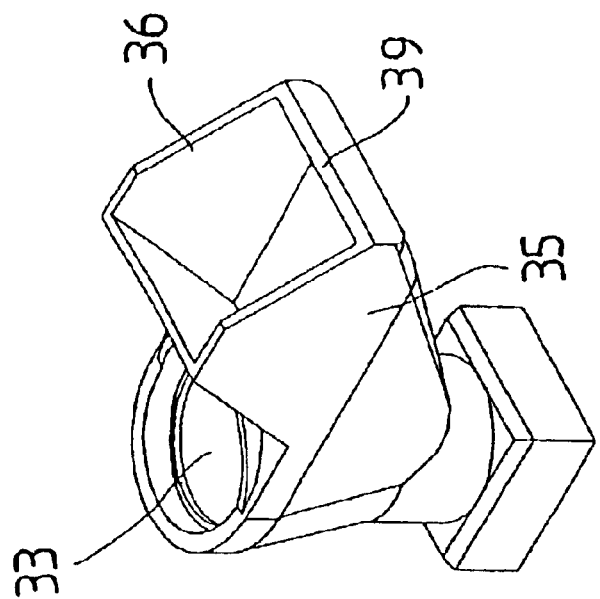
Figure 5:
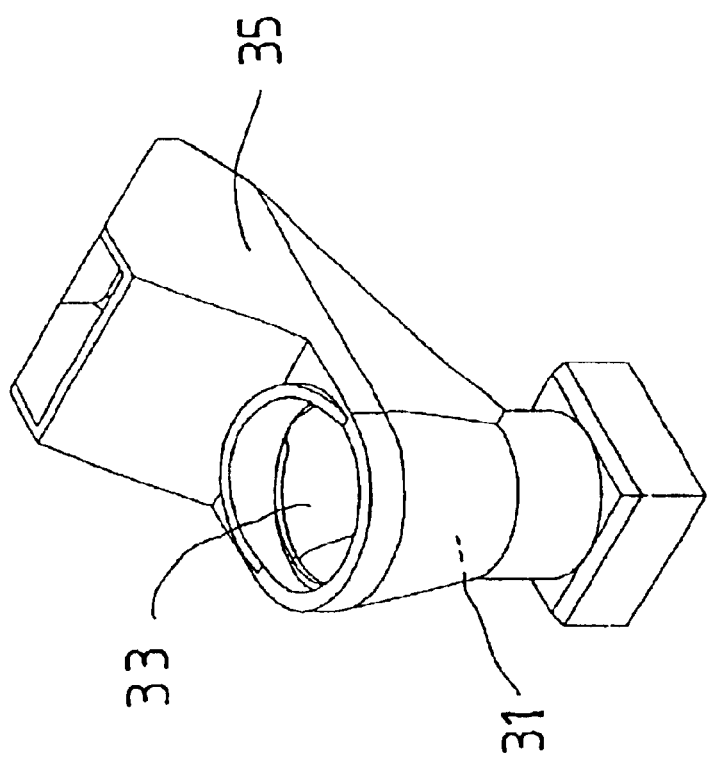

The invention is explained in greater detail below with reference to the schematic drawing, in which:

FIG. 1 shows a section through a cell according to the invention in the test position, FIG. 2 shows a section through the cell according to FIG. 1 in the handling position, FIG. 3 shows a section through a cell according to another embodiment of the invention in the test position, FIG. 4 shows a section through the cell according to FIG. 3 in the handling position, FIG. 5 shows a perspective representation of the cell according to FIG. 3, and FIG. 6 shows another perspective representation of the cell according to FIG. 3.

The cell shown in FIGS. 1 and 2 has a hollow space 11 which is filled with a liquid, for example water. The hollow space extends along an axis 12 which, in the test position shown in FIG. 1, coincides with the optical axis of the optical inspection system (not shown). From above, the hollow space 11 is delimited by a viewing glass 13. The lower area of the hollow space is configured as a test trough 14 in which the contact lens (not shown) is received in the test position.

Opening into the hollow space 11 there is an insertion channel 15 which has an outer opening 16 through which the contact lens can be inserted into the hollow space 11. The insertion channel extends substantially rectilinearly along an axis 17 which is perpendicular to the axis 12 of the hollow space 11. The term rectilinearly is to be understood here as meaning that a linearly moving gripper means can grip through the channel into the hollow space 11. In the handling position of the cell as shown in FIG. 2, this axis 17 extends vertically, so that the contact lens can be inserted and removed from above. After the contact lens has been inserted, the insertion opening 16 is closed tightly with a stopper 18, and the cell can be turned to the test position according to FIG. 1 without loss of liquid. Accordingly, in this embodiment, swivelling through 90° is necessary.

The position of the underside 19 of the viewing glass 13 on the one hand, and the dimensioning of the free volume of the insertion channel after fitting the stopper and the quantity of liquid on the other hand, are chosen such that, in the test position, the level 20 of the liquid lies above the underside 19 of the viewing glass. A space 21 acting as a gas trap is additionally provided in the area of the viewing glass 13. A bubble-free contact between viewing glass and liquid can thus be achieved.

A removal trough 22 is formed in the continuation of the insertion channel along the axis 17, on the side opposite the opening into the hollow space. This removal trough is connected via a transition area 23 to the test trough 14 in such a way that, when the cell is swivelled from the test position to the handling position, the contact lens slides from the test trough into the handling trough, and vice versa. The troughs 14, 22 can be connected to one another via a tangentially extending surface. The contact lens is therefore also fixed in the trough 22 in the handling position, so that the lens can be reliably gripped, for example by a vacuum gripper.

The cell shown in FIGS. 3 to 6 likewise has a hollow space 31 which is filled with a liquid, for example water. The hollow space extends along an axis 32 which, in the test position shown in FIG. 3, coincides with the optical axis of the optical inspection system (not shown). From above, the hollow space 31 is delimited by a viewing glass 33. The lower area of the hollow space is configured as a test trough 34 in which the contact lens 30 is received in the test position.

Opening into the hollow space 31 there is an insertion channel 35 which has an outer opening 36 through which the contact lens 30 can be inserted into the hollow space 31. The insertion channel extends substantially rectilinearly along an axis 37 which is at an angle of about 45° to the axis 32 of the hollow space 31. The term rectilinearly is also to be understood here as meaning that a linearly moving gripper means can grip through the channel into the hollow space 31. It is possible here, in principle, to use an obliquely inserted gripper in order to insert the contact lens and to remove it from the trough 34.

However, it is also advantageous here to swivel the cell between the test position according to FIG. 3 and a handling position. In the handling position of the cell as shown in FIG. 4, the axis 37 of the insertion channel extends vertically, so that the contact lens can be inserted and removed from above using a gripper means 38 which can be moved up and down. Accordingly, in this embodiment, swivelling through 45° is necessary.

The arrangement of the outer removal opening 36 and its lower boundary edge 39 is specifically such that, in the test position in which the axis 32 extends substantially vertically, said boundary edge 39 lies above the underside 40 of the viewing glass 33. The effect of this is that the underside is immersed in the liquid and a bubble-free contact between liquid and viewing glass is formed. Influencing of the optical inspection system by free boundary surfaces or by bubbles on the viewing glass is thus reliably avoided. In addition, in this embodiment, closure of the cell is no longer required for swivelling it into the test position. The cell can readily be turned from the handling position according to FIG. 4 to the test position according to FIG. 3 without any liquid being lost. When the cell is turned to the handling position, the liquid level in the insertion channel 35 sinks relative to the boundary edge 39, and the contact lens can be inserted and/or removed. Upon swivelling into the test position, the liquid in the insertion channel rises relative to the boundary edge 39, but without overspilling, and the underside of the viewing glass remains below the level of the liquid.

The automated test process can thus be considerably simplified in terms of the insertion/removal of the contact lens into/from the cell. It is expedient if the vertical distance between the top edge 39 of the opening 36 and the underside 40 of the viewing glass is sufficiently dimensioned so that loss of liquid can be avoided when moving the cell. Depending on the type of movement, a distance of 5 mm to 20 mm can be sufficient.

A removal trough 41 is formed in the continuation of the insertion channel 35 along the axis 37, on the side lying opposite the opening into the hollow space. This removal trough connects to the test trough 34 substantially without transition and is partially formed by the latter in such a way that, when the cell is swivelled from the test position to the handling position, the contact lens slides from the test trough into the handling trough and vice versa. The contact lens is fixed in this trough 41 in the handling position, so that gripping of the lens by the vacuum gripper 38 is reliably ensured.

In both embodiments, provision is made for the test trough 14, 34 to be a constituent part of an optical lens 24, 42. Provision can further be made for the viewing glass 13, 33 also to have active optical properties and be designed as an optical lens.

The above-described cells can be advantageously used in the testing of contact lenses (e.g. in a test module) in an automated production process. In such a test process or test module within the automated production process, the cell is first filled with test liquid (e.g. with water) in a filling station, since the contact lens test takes place in liquid. The cell is then loaded with the contact lens at a loading station. In the case of a cell with a closure stopper (see FIG. 1 and FIG. 2 for example), the cell is then closed at a closure station, although this can be dispensed with in the case of a cell without a closure stopper (see FIG. 3 and FIG. 4 for example). The cell is then turned or tilted into the test position (e.g. through an angle of 90° or 45°). The cell, with the lens situated in it, is then transported to an inspection station. The lens can be inspected both with the cell in a rest position and with (continuous) passage of the cell through the inspection station. After the contact lens has been inspected, the cell is transported away from the inspection station, whereupon the cell is turned (back) or tilted (back) again. If a cell with a closure stopper is used, the cell can now be opened (this can be dispensed with in the case of a cell without a closure stopper). Finally, the contact lens can be removed and the cell can then be moved back, and the above-described cycle can start anew.

A cleaning step can optionally be provided before the cell is filled with test liquid, in which case the cell is then cleaned either each time or only after several cycles, before being filled again. Likewise optionally, the steps or stations in which the cleaning, filling, loading, removal of the contact lens and the handling of the closure stopper take place can take place or be provided, respectively, in a discontinuous area, as a result of which a plurality of procedures (e.g. loadings) can be carried out in parallel. After the cell has been tilted, the cell can be transferred to a continuous transport system where, for example, it can first be transported along a certain length so that the test liquid in the cell can move and the lens to be tested can stabilize itself in the test position in the cell. A storage zone can then be provided to which the cell or a plurality of cells are transported from the transport system after the contact lens has been inspected. The cell can then be turned back or tilted back and be transferred from the continuous transport system back to a discontinuous area. After the cell has been opened (or tilted back), suctioning off of the test liquid can be provided for, if necessary, after which a sorting procedure can take place, for example if a plurality of cells are arranged on one tool carrier and different contact lenses are situated in the cells (e.g. contact lenses with different corrections, which after all can still be produced in parallel). After removal of the contact lenses, in the cell variant with a closure stopper, the return transport of the closure stopper has to be organized so that it can be reused in a subsequent cycle.

The division into a continuous area and a discontinuous area above all permits acceptable clock cycle times, with a plurality of operations (e.g. loadings) also being able to be carried out in parallel. The extent of the stations (e.g. the number of grippers for loading or removal) is adapted to the interface to the respective module (e.g. production module for transferring the lenses to be tested, or packaging module for dispensing the tested lenses).

In the test module itself, in order to save time, the transfer of the cells from the discontinuous area to the continuous transport system can be effected by transverse transport (e.g. with the aid of slides), as a result of which the paths (and thus the time) are shortened. The transport between the individual stations in the discontinuous area can be effected with the aid of conveyor belts. When the necessary number of cells is ready, the transverse transport to the continuous transport system can take place. The continuous transport of the cells in the inspection area permits the fixed arrangement/mounting of an inspection head in the inspection area, a displacement of an inspection head (which is equipped with a camera for example) is not necessary during the system cycle. Before the inspection station, a stabilisation zone with uniform transport speed (see above) can be provided so that the lens can correctly take up position in its test position in the cell. An important point here is that transverse accelerations do not occur which could make correct positioning of the lens difficult. To prevent stoppage of the continuous transport system on account of a blockage at the opening station (cells with closure stopper), a storage area (see above) can be provided for receiving cells with tested contact lenses after the inspection. The storage volume can correspond to the extension of the stabilization zone. In addition, the area can run with a slightly higher transport speed after inspection.

As has already been mentioned, a number of steps can be dispensed with especially in the case of the cells without closure stoppers (e.g. the suctioning, the opening and closing of the cell, and the complete handling of the closure stoppers). Individual stations (e.g. cleaning and filling of the cell) can also be combined, for example, or can be dispensed with competely (e.g. the suctioning).

What is claimed is:

1. A cell for testing an ophthalmic lens with an optical inspection system, said cell comprising a hollow space which is filled with a liquid and has an axis coinciding, in a test position, with the optical axis of the inspection system, and, in the test position of the cell, the hollow space is delimited from above by a viewing glass for the optical test and has, underneath the viewing glass, a test trough for the ophthalmic lens. characterized in that, between viewing glass and test trough, at least one insertion channel opens into the hollow space, the ophthalmic lens being able to be inserted into the hollow space through an outer insertion opening of said insertion channel.

2. A cell according to claim 1, characterized in that the insertion opening of the insertion channel can be closed.

3. A cell according to claim 1, characterized in that the Insertion channel has an axis and opens into the hollow space in such a way that the insertion channel with its axis encloses, together with the hollow space and its axis, an angle of between 0° and 90°, and in that, in order to insert and/or remove the ophthalmic lens, the cell can be swiveled into a handling position in such a way that the insertion opening of the insertion channel points upwards.

4. A cell according to claim 3, characterized in that, In the handling position, the insertion channel extends with its axis vertically.

5. A cell according to claim 1, characterized in that, In the test position, the hollow space extends with its axis vertically.

6. A cell according to claim 1, characterized in that the insertion channel with its axis opens at an angle of between 45° and 90° into the hollow space with its axis, and in that the volume of the insertion channel and of the hollow space and the quantity of liquid and the position of the viewing glass are chosen such that, in the test position, the underside of the viewing glass lies at or below the level of the liquid.

7. A cell according to claim 1, characterized in that the Insertion channel with its axis opens at an angle of between 30° and 60° into the hollow space with its axis, and in that the boundary edge of the insertion opening of the insertion channel lies, In the test position, above the underside of the viewing glass.

8. A cell according to claim 1, characterized in that In the area around the viewing glass there is a space acting as a gas trap, the upper boundary wall of which, in the test position, lies above the underside of the viewing glass.

9. A cell according to claim 1, characterized in that in the continuation of the Insertion channel, opposite where the latter opens into the hollow space, there is a removal trough in which, in a handling position, the ophthalmic lens lies ready for removal.

10. A cell according to claim 1, characterized in that a removal trough is formed by a recess in the lateral boundary wall of the hollow space.

11. A cell according to claim 1, characterized in that the test trough continues into a removal trough substantially without a transition.

12. A cell according to claim 1, characterized in that between removal trough and test trough there is a transition which is configured in such a way that, during swiveling from the test position to the handling position and vice versa, the ophthalmic lens slides from one trough into the other.

13. A cell according to claim 1, characterized in that the test trough is a constituent part of an optical lens.

14. A cell according to claim 1, characterized in that the viewing glass is an optical lens.

15. A method for testing contact lenses in a cell, said cell being configured according to claim 1, comprising the steps of filling the cell with a liquid in a handling position; loading the cell with a contact lens which is to be tested; turning or tilting the cell from the handling position to the test position; Inspecting the contact lens by an optical inspection system; turning or tilting the cell from the test position back to the handling position; and removing the contact lens from the cell.

16. A method according to claim 15, further comprising a step of cleaning the cell before being filled with liquid.

17. A method according to claim 15, wherein, in the case of a closable cell, said cell is closed before being turned or tilted from the handling position to the test position, and wherein, after the contact lens has been inspected and after the cell has been turned or tilted back from the test position to the handling position, the cell Is once again opened so that the contact lens can be removed from the cell.

18. A method according to claim 15, In which individual method steps are assigned to at least one discontinuous area and other method steps are assigned to a continuous area, wherein at least the method steps of filling the cell with liquid, loading the cell with a contact lens, turning or tilting the cell from the handling position to the test position, and removing the contact lens from the cell are assigned to a discontinuous area.

* * * * *